C. E. SMITH.
CHAIN MAT FOR WHEEL TIRES.
APPLICATION FILED FEB. 11, 1913.
1,065,084.
Patented June 17, 1913.
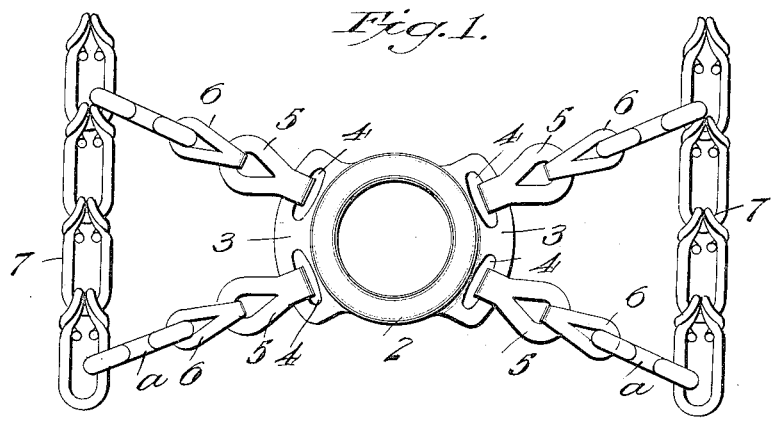
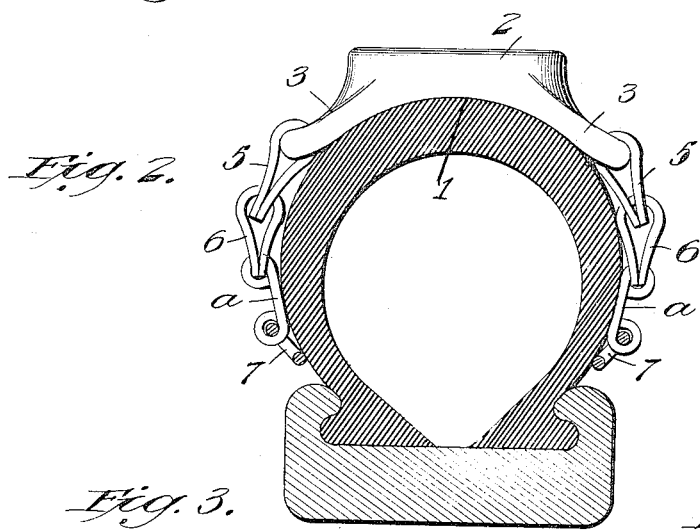
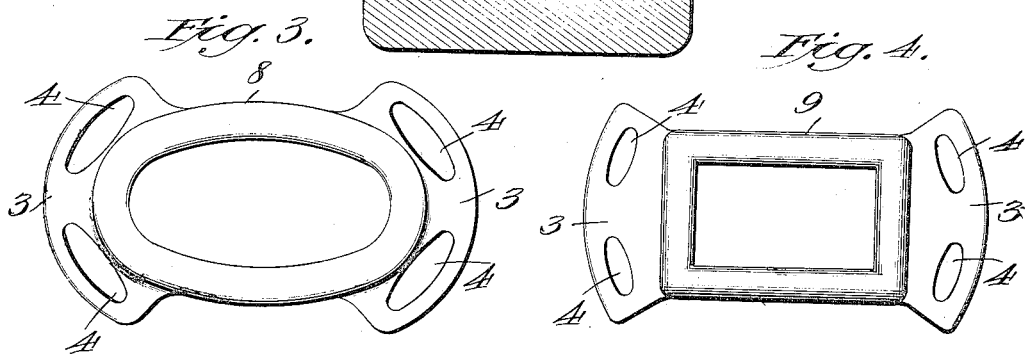
Witnesses
Inventor
Charles E. Smith
By
Attorney

UNITED STATES PATENT OFFICE.

CHARLES E. SMITH, OF BRIDGEPORT, CONNECTICUT, ASSIGNOR TO THE WALKER TIRE CHAIN COMPANY, OF TOLEDO, OHIO, A CORPORATION OF OHIO.

CHAIN MAT FOR WHEEL-TIRES.

1,065,084.  Specification of Letters Patent. Patented June 17, 1913.

Application filed February 11, 1913. Serial No. 747,601.

*To all whom it may concern:*

Be it known that I, CHARLES E. SMITH, a citizen of the United States, residing in the city of Bridgeport, county of Fairfield, State of Connecticut, have invented certain new and useful Improvements in Chain Mats for Wheel-Tires; and I do declare the following to be a full, clear, and exact description of the invention, such as will enable others skilled in the art to which it appertains to make and use the same.

This invention relates to the subject of anti-skidding mats for tires, and the primary aim of the invention is to provide a tire mat that will firmly engage the roadway and thereby prevent skidding, and also to arrange the parts of the mat so that the mat will not move relative to the tire, and to dispose the said parts of the mat so that the wear will come on the tread pieces instead of on the cross chains.

With the above generally stated objects of the invention in view, it is contemplated providing tread pieces which transversely embrace, or interlock, and snugly fit the tire so that all the wear comes on said pieces, and providing said pieces with a novel arrangement of anchorages which coöperate with the side chains to hold the cross chains snugly in engagement with the sides of the tire where they will have no contact with the ground or roadway, the connection between the anchorages and the side chains being such that the cross chains are prevented from having rolling or axial movements, and said cross chains prevent movement of the tread pieces relative to the tire.

In the practical application of an anti-skidding tire mat possessing the characteristics outlined in the foregoing, it will be readily apparent that modifications and variations may be resorted to within the scope of the appended claim, a few simple and practical embodiments thereof being shown in the accompanying drawings, wherein—

Figure 1 is a top plan view of one section of the improved tire mat—Fig. 2 is a cross sectional elevation showing my improvement upon a tire, and Figs. 3 and 4 are detail views of modifications of the tread pieces of the improved mat.

The improved tire mat is of the same general nature as that set forth in the co-pending application, Serial No. 730,004, filed November 7, 1912, by Maurice A. Car- ter, the distinction being that the present invention includes tread pieces that embrace or interlock with the tire and overlap the tread thereof so that the only portion of the mat that engages the roadway is said pieces, the end portions of the tread pieces being provided with extensions having anchorages formed therein that are disposed in a plane closer to the tire than the road-engaging tread pieces, by means of which the cross chains that connect with the side chains are held snugly to the sides of the tire in positions where they do not contact with the roadway.

Referring to the accompanying drawings by numerals, it will be seen that the improved mat is made up of a plurality of duplicate sections, each including a tread piece that is disposed on the center of the tread of the tire, said tread piece comprising a concaved base 1 of a contour that permits the same to snugly embrace or interlock transversely with the tread of the tire, the outer central portion of the tread piece being in the form of an outstanding ring 2 that engages the roadway, said base being provided with oppositely disposed lateral end extensions 3 conforming to the contour of the base and overlapping the sides of the tire, said extensions projecting beyond the tread of the tire and forming continuations of said base.

Each extension 3 is provided with openings 4 that are disposed well within said extensions, or, in other words, away from the side edges thereof, the openings serving as anchorages for the end links 5 to which are connected links 6. Hooks *a* are connected to the links 6 and to the side chains 7, which hooks, and the links 5, 6, constitute the cross chains of my improvement which connect the tread ring 2 with the side chains, the latter being secured to the wheel in the usual or any preferred manner, not shown.

It will be seen that the anchorages 4 are so disposed in the extensions 3 that the cross chains radiate therefrom, the attaching links 5 being loosely connected to said anchorages so that the cross chains will flexibly conform to the contour of the sides of the tire, while at the same time axial movements of said cross chains are prevented. The radiating arrangement of the cross chains is such that they exert pulls or strains on the tread pieces in opposite directions and thereby prevent movement of said tread pieces relative to the tire, in substantially the same manner as that described in the above identified application.

From the foregoing description it will be apparent that distinctive features of this invention are the concaved base and end extensions 1 and 3, respectively, which interlock with and entirely overlap and project beyond the tread of the tire, thereby retaining the cross chains snugly to the sides of the tire where they receive none of the wear, and in the provision of the central outstanding roadway engaging portions 2 which project well beyond the extensions 3 so that the anchor-engaging links 5 and the cross chains are shielded from wear incidental to contact with the roadway.

Variations of the type of roadway-engaging portions 2 of the mat may be resorted to, a few examples being shown in Figs. 3 and 4, wherein, as is suggested in Fig. 3, the roadway engaging portion may be in the form of an oval designated by the numeral 8, or in the form of a rectangle designated by the numeral 9 as is shown in Fig. 4.

What I claim as my invention is:—

In a tire mat, the combination with side chains, of tread pieces including a base conforming to the transverse contour of and adapted to interlock with a tire, said base having a central outstanding ring-shaped roadway engaging portion, said base having end extensions that conform to the contour of and lie on the tire out of contact with the roadway, said end extensions each having anchor openings therein adjacent the corners of the free ends thereof, and securing chains lying in contact with the sides of the tire and having one of their ends fixed to the anchor openings and their other ends connected with the side chains.

In testimony whereof I affix my signature in presence of two witnesses.

CHARLES E. SMITH.

Witnesses:
F. W. SMITH, Jr.,
M. T. LONGDEN.